March 1, 1932. N. R. KRAUSE 1,847,433
CONVEYER
Filed May 2, 1931
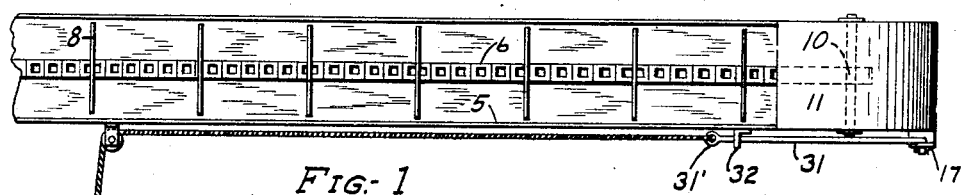
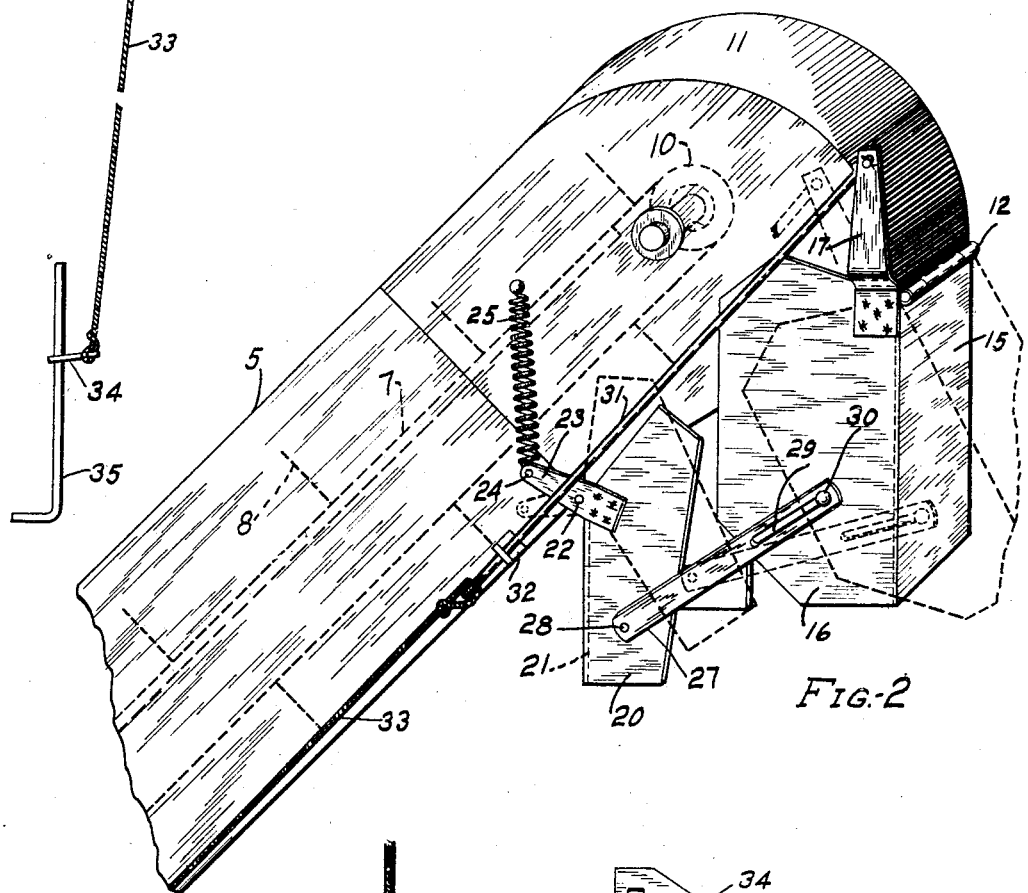
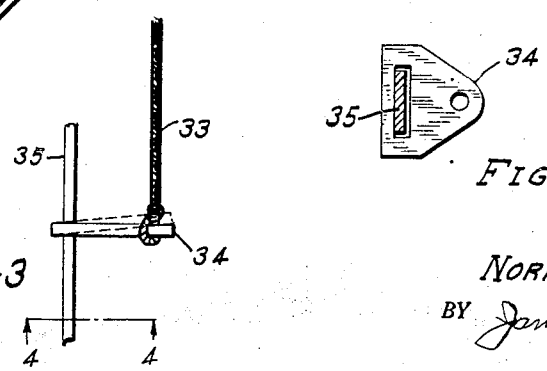
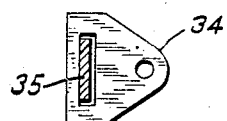
INVENTOR.
NORMAN R. KRAUSE,
BY James A. Walsh
ATTORNEY Patented Mar. 1, 1932

1,847,433

UNITED STATES PATENT OFFICE

NORMAN R. KRAUSE, OF RACINE, WISCONSIN, ASSIGNOR TO J. I. CASE COMPANY, OF RACINE, WISCONSIN, A CORPORATION

CONVEYER

Application filed May 2, 1931. Serial No. 534,596.

My invention relates to conveyers especially adapted for use in connection with agricultural machines such as corn harvesters, and consists in certain improvements whereby material may be conveyed therefrom and discharged into wagons or otherwise, the distribution thereof being under control of an operator to be varied as desired, and which improvements may also be adapted for use under other conditions and for other purposes, as will be understood from the following description.

In the accompanying drawings, forming part thereof, Figure 1 is a fragmentary plan view of a conveyer embodying my improvement, the operating devices for the deflector being shown applied thereto; Fig. 2, a side elevation; and Figs. 3 and 4 are detail views of fastening means for the operating devices, Fig. 4 being taken on the dotted line 4—4 in Fig. 3.

In said drawings the numeral 5 indicates a chute of any desired construction, in which an endless carrier, 6, is mounted, comprising a chain 7 and flights 8 of a common and well known construction, the upper turn of the carrier passing about a roller, as 10, and the lower turn (not shown) is likewise mounted in connection with suitable actuating mechanism of any selected arrangement.

The chute 5 embodies a hood, as 11, at the outer end of which, at 12, is hingedly mounted a deflector comprising end and side walls 15, 16, respectively, connected together, and to one of the side walls an arm 17 is secured for a purpose to appear, said side walls being of any desired design, that indicated proving highly practical for my purpose. Adjacent said side walls I provide an inner deflector composed of side and end walls 20, 21, which deflector is hingedly connected, at 22, to the chute, and carries an arm 23 connected at 24 to the chute by a spring 25; and said inner and outer deflectors are connected to each other by a sliding link 27, pivoted at 28 to the inner deflector, its opposite end having a slot 29 therein pivotally connected by a stop 30 to the outer deflector, which link retains the deflectors in normal relation to each other.

To the arm 17 I connect an operating rod 31 which passes through a guide 32 on the chute and provided with a stop 31', and attached to the rod is a rope or cable 33 the opposite end of which is connected to a keeper 34 slidably mounted on a part 35 of the machine within reach of an operator, said keeper being loosely mounted so that it may be readily shifted along its mounting and turned at a slight angle to frictionally engage therewith, and by a pull on the rope after adjusting the deflector said keeper will be held in fixed position as indicated by the dotted lines in Fig. 3, it being understood that the keeper is shifted manually to adjust the rope.

In practical use, it will be understood that the deflector elements as indicated in full lines are in normal position to deflect material into that side of a wagon body nearest the inner deflector 20, that is, the material is discharged in vertical direction by the inner and outer deflectors, which are held in such position by the link 27. However, when it is desired to deflect material to the opposite side of the wagon body the deflectors may be adjusted by pulling the rope 33, which in turn causes the rod 31 and arm 17 to swing the outer deflector, and, with it, the inner deflector, by means of the link 27 connecting them, to the positions of the deflectors respectively indicated by the dotted lines in Fig. 2, or varying degrees thereof, so that the discharging material passing through the deflectors will be distributed in an inclined or outward predetermined direction in relation to the chute. This varied distribution is of advantage particularly in conveying cleaned ear corn from a harvester and loading the same into a complementary wagon when they are drawn through the field together by a tractor, as it is the practice to provide means whereby the wagon may be moved in longitudinal directions so that the discharging load will fall first into one end, in the middle, and then in the opposite end, and, as my improved conveyer is adjustable in the manner described, during the movements of the wagon it will be understood that the load will be evenly distributed therein so that no manual spreading or otherwise handling of the material with implements becomes necessary. As the outer deflector draws the inner deflector into the position indicated by the dotted lines in Fig. 2, or substantially so, it will be understood that the turning of the arm 23 on the inner deflector distends the spring 25, so that when adjusting the deflectors to inward positions the reciprocating rod 31 is released, whereupon the retracting spring 25, through the arm 23 and link 27, automatically returns said parts to normal or predetermined position as may be desired, the outward limit of movement thereof being controlled by the stop 31' which engages the guide 32 to prevent further outward movement of the rod 31. While I have shown and described the deflectors to be adjusted simultaneously and as a unit it will be understood that should the wagon in any manner, as by ground irregularities, contact with the inner deflector to force it toward the outer deflector the inner one will be free to so move by reason of the pivotal mounting at 28 and the stop 30 from which the slot 29 extends and by which connection the link 27 will slide forwardly during such occurrence to permit the inner deflector to move accordingly and thus avoid being damaged.

From the foregoing description it will be understood that I provide a conveyer chute terminating in a hinged deflector comprising two sections which are actuated for adjustment through a linkage system which produces a parallel movement of both sections together, thus constantly maintaining the normal area of the sections as a unit in their varied simultaneous movements, as well as providing for the independent movement of the inner section in the circumstances referred to.

I claim as my invention:

1. In a conveyer having a chute, an outer deflector connected thereto, an inner deflector hingedly connected to the chute, sliding means connecting the inner and outer deflectors whereby the inner deflector may swing independently of the outer deflector, and means for returning the inner deflector to normal position.

2. In a conveyer having a chute, a deflector including two sections hingedly connected to the chute, means for simultaneously swinging said sections outwardly and inwardly, means connecting said sections for maintaining them in normal parallel relation to each other during the swinging movements thereof, and means whereby one of the sections may be swung independently of the other section.

3. In a conveyer having a chute, a deflector comprising two sections hingedly connected to the chute, reciprocating means for swinging said sections outwardly, means associated with the reciprocating means for limiting its outward movement, and means independent of the reciprocating means for swinging one of said sections inwardly.

In testimony whereof I affix my signature.

NORMAN R. KRAUSE.